US011626806B2

(12) United States Patent
Dong et al.

(10) Patent No.: US 11,626,806 B2
(45) Date of Patent: Apr. 11, 2023

(54) BIDIRECTIONAL ISOLATED RESONANT CONVERTER WITH INTEGRATED RESONANT INDUCTOR AND ISOLATED TRANSFORMER

(71) Applicant: Delta Electronics (Shanghai) Co., Ltd., Shanghai (CN)

(72) Inventors: Na Dong, Shanghai (CN); Lei Chang, Shanghai (CN); Haijun Yang, Shanghai (CN); Zengyi Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 363 days.

(21) Appl. No.: 16/944,130

(22) Filed: Jul. 30, 2020

(65) Prior Publication Data

US 2021/0083589 A1 Mar. 18, 2021

(30) Foreign Application Priority Data

Sep. 12, 2019 (CN) .......................... 201910863012.X (51) Int. Cl.
*H02M 3/335* (2006.01)
*H02M 3/00* (2006.01)
(Continued)

(52) U.S. Cl.
CPC ........ *H02M 3/33584* (2013.01); *H01F 27/26* (2013.01); *H01F 27/2823* (2013.01);
(Continued)

(58) Field of Classification Search
CPC H02M 3/33584; H01F 27/26; H01F 27/2823; H01F 27/32
See application file for complete search history.

(56) References Cited

U.S. PATENT DOCUMENTS

2010/0253458 A1 10/2010 Chen et al.
2012/0056707 A1 3/2012 Jung et al.
(Continued)

FOREIGN PATENT DOCUMENTS

CN 102510221 A 6/2012
CN 103762846 A * 4/2014
(Continued)

OTHER PUBLICATIONS

Machin translation of "CN 110729903" Tan, Magnetic Device and A Bidirectional DC Conversion Circuit (Year: 2020).*

*Primary Examiner* — Sisay G Tiku
(74) *Attorney, Agent, or Firm* — CKC & Partners Co., LLC (57) ABSTRACT

A bidirectional isolated resonant converter includes a first side circuit, a second side circuit, and a resonant tank circuit. The resonant tank circuit includes a first resonant capacitor, a resonant inductor, an isolated transformer and a second capacitor. The first resonant capacitor, the resonant inductor and a first side winding of the isolated transformer are connected in series. A second side winding of the isolated transformer and the second capacitor are connected in series. The resonant inductor and the isolated transformer are integrated into an integrated magnetic component, wherein a magnetic core of the integrated magnetic component includes an inductor magnetic core portion on which an inductor winding is wound, a transformer magnetic core portion on which the first side winding and the second side winding are wound, and a common magnetic core portion shared by the resonant inductor and the isolated transformer to form closed magnetic paths, respectively.

13 Claims, 7 Drawing Sheets

(51) Int. Cl.
*H01F 27/26* (2006.01)
*H01F 27/28* (2006.01)
*H01F 27/32* (2006.01)
*H01F 27/40* (2006.01)

(52) U.S. Cl.
CPC ............ *H01F 27/32* (2013.01); *H01F 27/40* (2013.01); *H02M 3/01* (2021.05); *H02M 3/33573* (2021.05); *H02M 3/003* (2021.05)

(56) References Cited

U.S. PATENT DOCUMENTS

| | | | | |
|---|---|---|---|---|
| 2017/0345541 | A1* | 11/2017 | Yang | H01F 3/10 |
| 2018/0138801 | A1* | 5/2018 | Chen | H01F 27/40 |
| 2018/0278174 | A1* | 9/2018 | Chen | H01F 27/306 |
| 2018/0351469 | A1 | 12/2018 | Kakalashvili | |
| 2018/0366267 | A1* | 12/2018 | Raimann | H01F 27/38 |
| 2019/0058408 | A1* | 2/2019 | Hao | H02M 7/493 |
| 2019/0362885 | A1* | 11/2019 | Lu | H01F 27/32 |
| 2020/0083817 | A1* | 3/2020 | Liu | H02M 3/01 |
| 2020/0304030 | A1* | 9/2020 | Jin | H02M 3/33576 |
| 2020/0412252 | A1* | 12/2020 | Kimura | H02M 3/01 |
| 2020/0412261 | A1* | 12/2020 | Fujimoto | H01F 27/40 |
| 2022/0158562 | A1* | 5/2022 | Yang | H02M 3/1586 |
| 2022/0181986 | A1* | 6/2022 | Zhou | H01F 3/14 |
| 2022/0230797 | A1* | 7/2022 | Afsharian | H02M 3/33576 |

FOREIGN PATENT DOCUMENTS

| | | | | |
|---|---|---|---|---|
| CN | 102064699 | B | 5/2016 | |
| CN | 106533130 | A | 3/2017 | |
| CN | 206076023 | U * | 4/2017 | |
| CN | 206775390 | U | 12/2017 | |
| CN | 108288533 | A | 7/2018 | |
| CN | 108736734 | A | 11/2018 | |
| CN | 108736734 | A * | 11/2018 | |
| CN | 208571930 | U | 3/2019 | |
| CN | 208571930 | U | 3/2019 | |
| CN | 110492754 | A * | 11/2019 | ............ H01F 27/24 |
| CN | 110634655 | A * | 12/2019 | ............ B60L 53/22 |
| CN | 110729903 | A * | 1/2020 | ............ H01F 27/24 |
| CN | 111404393 | A * | 7/2020 | |
| CN | 112054691 | A * | 12/2020 | ........... H01F 27/306 |
| CN | 112398346 | A * | 2/2021 | |
| CN | 213150542 | U * | 5/2021 | |
| CN | 108475576 | B * | 9/2021 | ............ H01F 27/28 |
| EP | 3518257 | A1 | 7/2019 | |
| EP | 3792942 | A1 * | 3/2021 | ............ H01F 27/24 |
| WO | WO-2021027348 | A1 * | 2/2021 | ............ B60L 53/22 |

* cited by examiner

BIDIRECTIONAL ISOLATED RESONANT CONVERTER WITH INTEGRATED RESONANT INDUCTOR AND ISOLATED TRANSFORMER

CROSS-REFERENCE TO RELATED APPLICATIONS

This non-provisional application claims priority under 35 U.S.C. § 119(a) on Patent Application No. 201910863012.X filed in P.R. China on Sep. 12, 2019, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to the technical field of switching power supply, and particularly to a bidirectional isolated resonant converter.

2. Related Art

With high-speed development of the switching power supply technology, more and more power supply products are developing towards the direction of higher efficiency, higher power density, higher reliability and lower cost. However, in addition to those requirements, power supply modules for automotive electronics further need to work in the condition of a higher ambient temperature.

In the power supply modules for automotive electronics, an on Board Charger (OBC) having a bidirectional charging function is a key component. Bidirectional charging means that the OBC can both charge and discharge. Charge refers to that the OBC charges an on board high voltage battery after being connected to a power supply, wherein an input voltage is ranged from 85 to 265 $V_{ac}$, and an output voltage is ranged from 275 to 450 $V_{dc}$ (or a wider range). Discharge means that the OBC obtains a DC current from the on board high voltage battery, and supplies an AC current after power conversion to applications of some on board devices or feedback to the grid, wherein an input voltage is ranged from 275 to 450 $V_{dc}$ (or a wider range), and an output voltage may be 220 $V_{ac}$.

A magnetic component takes up a large proportion of volume, weight and loss in the OBC. However, most conventional magnetic components are in discrete structures, i.e., inductor and transformer in the OBC circuit are separated without any magnetic correlation between each other, and such structure makes the magnetic component have a larger size, a heavier weight, and a higher loss also.

SUMMARY OF THE INVENTION

Embodiments of the invention provide a bidirectional isolated resonant converter, which solves the technical problem of large size, heave weight and high loss of the magnetic components in the conventional bidirectional isolated resonant converter.

Embodiments of the invention provide a bidirectional isolated resonant converter, comprising a first side circuit, a second side circuit, and a resonant tank circuit electrically coupled to the first side circuit and the second side circuit, the resonant tank circuit comprising a first resonant capacitor, a resonant inductor, an isolated transformer and a second capacitor, wherein the first resonant capacitor, the resonant inductor and a first side winding of the isolated transformer are connected in series, a second side winding of the isolated transformer and the second capacitor are connected in series;

wherein the resonant inductor and the isolated transformer are integrated into an integrated magnetic component, and a magnetic core of the integrated magnetic component comprises an inductor magnetic core portion on which an inductor winding of the resonant inductor is wound, a transformer magnetic core portion on which the first side winding and the second side winding of the isolated transformer are wound, and a common magnetic core portion shared by the resonant inductor and the isolated transformer to form closed magnetic paths, respectively;

wherein when the same current is flowing in the inductor winding and the first side winding, a magnetic flux generated by the resonant inductor and a magnetic flux generated by the isolated transformer have the same direction on the common magnetic core portion.

The bidirectional isolated resonant converter provided by the present invention integrates the resonant inductor and the isolated transformer into an integrated magnetic component, thereby reducing volume of the converter. Meanwhile, by arranging the magnetic core structures and wrapping manners of the resonant inductor and the isolated transformer, the magnetic flux generated by the resonant inductor and the magnetic flux generated by the isolated transformer are in the same direction on the common magnetic core portion when the same current is flowing in the inductor winding and the first side winding of the isolated transformer, and further, when the converter works normally in a boost condition, the magnetic flux generated by the resonant inductor and the magnetic flux generated by the isolated transformer can be at least partially offset, thereby reducing loss of the converter.

DETAILED EMBODIMENTS OF THE INVENTION

Hereinafter the invention is further described in detail with reference to the appended drawings and the specific embodiments. The embodiments are carried out with implementing ways and operational processes on the premise of the technical solution of the invention, but the protection scope of the invention is not limited thereto.

Figure 1:
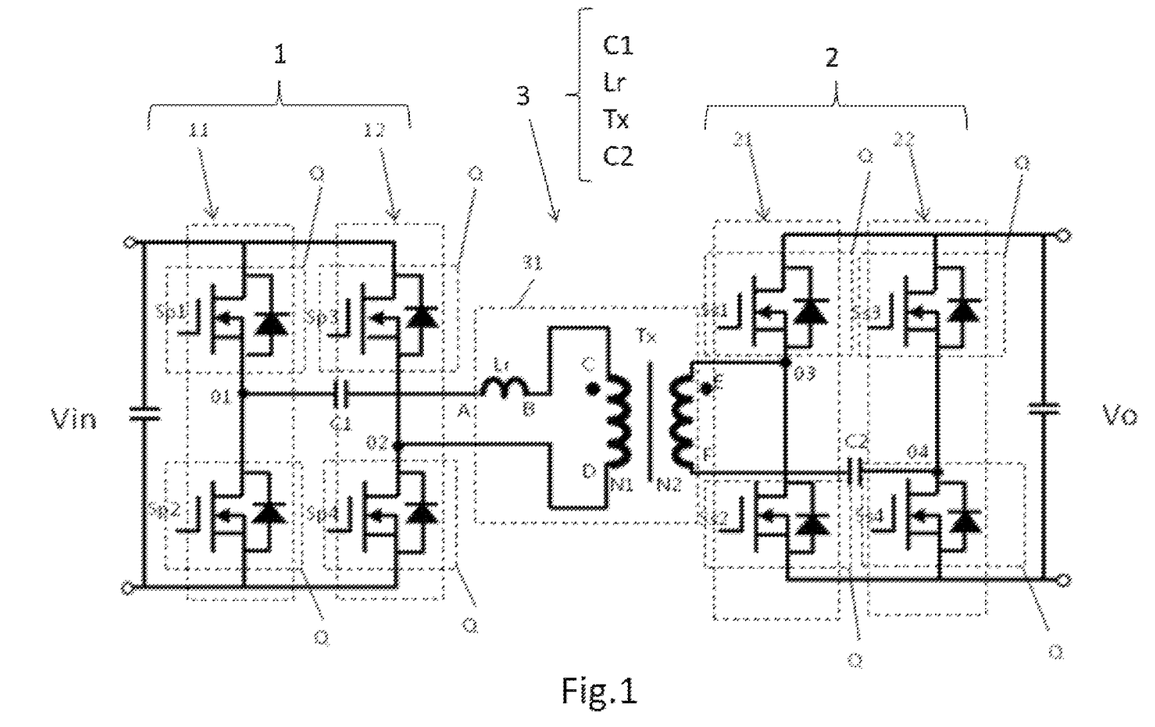
FIG. 1 is a circuit diagram of a bidirectional isolated resonant converter according to the invention.
Figure 2:
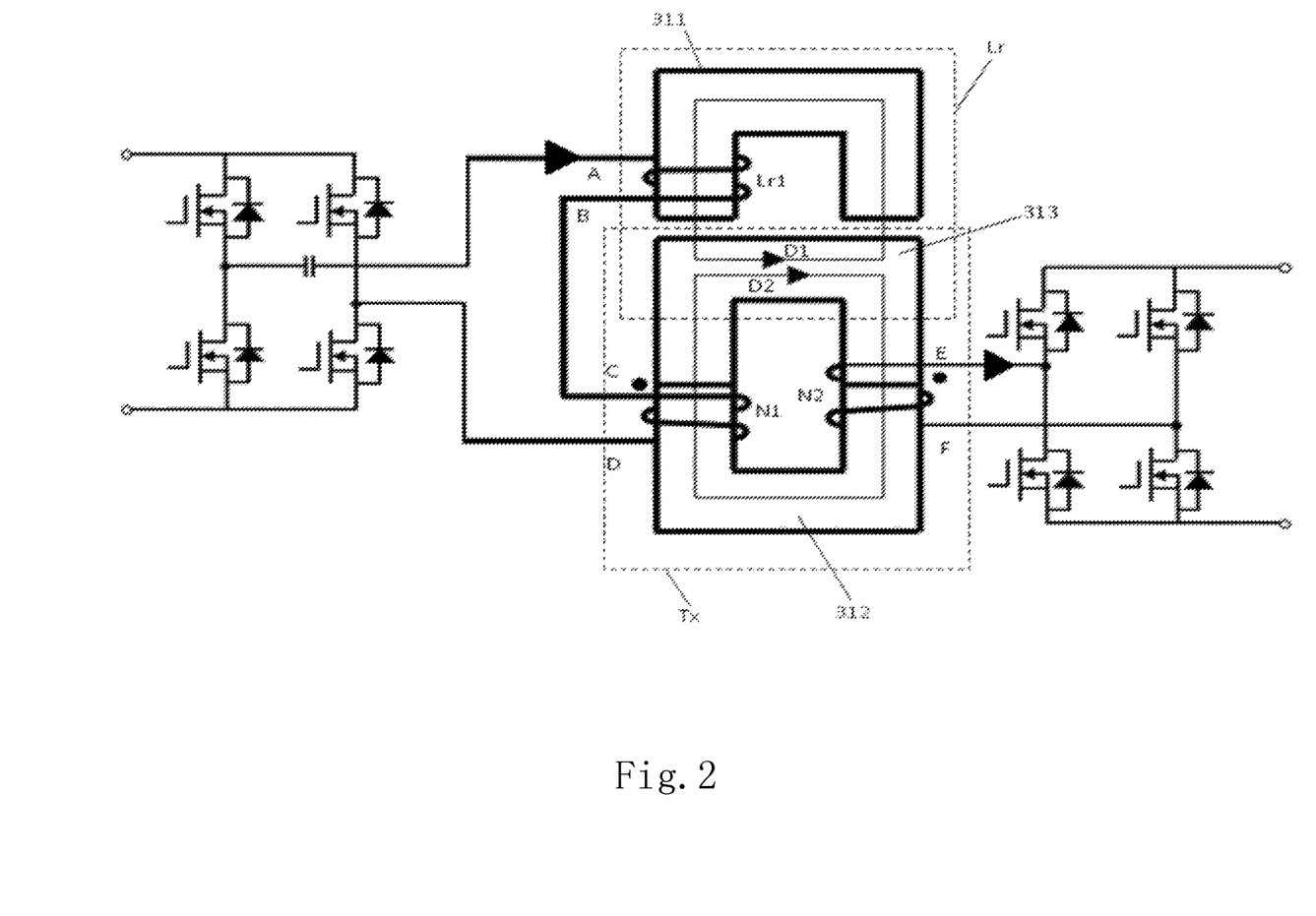
FIG. 2 is a connection diagram of a first embodiment of an integrated magnetic component according to the invention.
Figure 3:
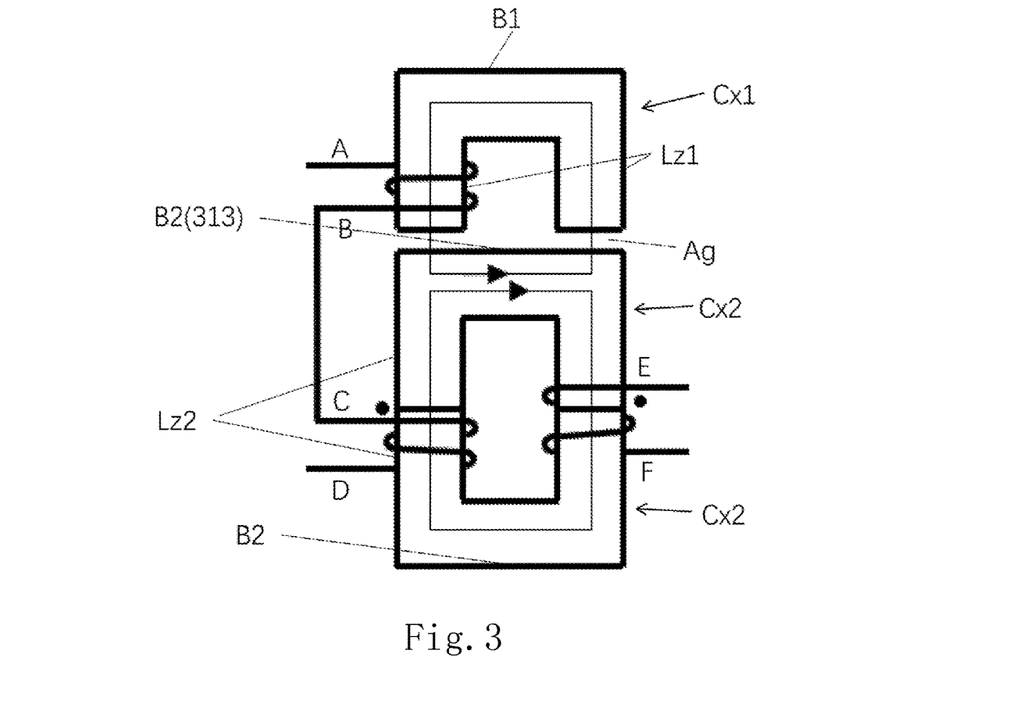
FIG. 3 is a structure diagram of the integrated magnetic component in FIG. 2.

Please refer to FIGS. 1-3, wherein FIG. 1 is a circuit diagram of a bidirectional isolated resonant converter according to the invention, FIG. 2 is a connection diagram of a first embodiment of an integrated magnetic component according to the invention, and FIG. 3 is a structure diagram of the integrated magnetic component in FIG. 2.

As shown in FIGS. 1-3, the bidirectional isolated resonant converter in the embodiment of the invention comprises a first side circuit 1, a second side circuit 2, and a resonant tank circuit 3 electrically coupled between the first side circuit 1 and the second side circuit 2. The resonant tank circuit 3 comprises a first resonant capacitor C1, a resonant inductor Lr, an isolated transformer Tx and a second capacitor C2. The first resonant capacitor C1, the resonant inductor Lr and a first side winding N1 of the isolated transformer Tx are connected in series, and a second side winding N2 of the isolated transformer Tx and the second capacitor C2 are connected in series. The resonant inductor Lr and the isolated transformer Tx are integrated into an integrated magnetic component 31. A magnetic core of the integrated magnetic component 31 comprises an inductor magnetic core portion 311 on which an inductor winding Lr1 of the resonant inductor Lr is wound, a transformer magnetic core portion 312 on which the first side winding N1 and the second side winding N2 of the isolated transformer Tx are wound, and a common magnetic core portion 313 shared by the resonant inductor Lr and the isolated transformer Tx to form closed magnetic paths, respectively. When the same current is flowing in the inductor winding Lr1 and the first side winding N1, a magnetic flux generated by the resonant inductor Lr and a magnetic flux generated by the isolated transformer Tx are in the same direction on the common magnetic core portion 313.

In FIG. 2, an arrow D1 represents a direction of the magnetic flux generated by the resonant inductor Lr, and an arrow D2 represents a direction of the magnetic flux generated by the isolated transformer Tx. According to the magnetic core structures, the wrapping manners and the current flowing directions shown in FIGS. 2, D1 and D2 are pointing towards right in FIG. 2. However, the disclosure is not limited thereto.

It shall be noted that "the same current" means that the current flowing in the inductor winding Lr1 and the current flowing in the first side winding N1 have the same magnitude and phase.

Further, the inductor magnetic core portion 311 is provided with at least one air gap Ag to obtain resonant inductance required by the resonant tank circuit.

Further, the first side circuit 1 is a full-bridge circuit comprising a first bridge arm 11 and a second bridge arm 12. One terminal C of the first side winding N1 is electrically connected to a midpoint of the first bridge arm 11 via the resonant inductor Lr and the first resonant capacitor C1 sequentially, and the other terminal D of the first side winding N1 is electrically connected to a midpoint of the second bridge arm 12 (a connection order is not limited thereto). The second side circuit 2 is a full-bridge circuit comprising a third bridge arm 21 and a fourth bridge arm 22. One terminal E of the second side winding N2 is electrically connected to a midpoint of the third bridge arm 21, and the other terminal F of the second side winding N2 is electrically connected to a midpoint of the fourth bridge arm 22 via the second capacitor C2. The first side circuit and the second side circuit are also not limited to full-bridge topologies.

The first bridge arm 11, the second bridge arm 12, the third bridge arm 21 and the fourth bridge arm 22 each comprises two switches groups Q connected in series between which the midpoints are located. In this embodiment, each of the switches groups Q comprises a switch, respectively. For example, the first bridge arm 11 comprises two switches Sp1 and Sp2 connected in series with a midpoint O1; the second bridge arm 12 comprises two switches Sp3 and Sp4 connected in series with a midpoint O2; the third bridge arm 21 comprises two switches Ss1 and Ss2 connected in series with a midpoint O3; the fourth bridge arm 22 comprises two switches Ss3 and Ss4 connected in series with a midpoint O4. But the invention is not limited thereto. In other embodiments, each switches groups may also comprise a plurality of switches connected in parallel or in series, or in hybrid connection (various combination schemes of serial and parallel connections), or comprise an external diode in antiparallel connection with the switches.

Even further, the common magnetic core portion 313 is located between the inductor magnetic core portion 311 and the transformer magnetic core portion 312. When the same current is flowing in the inductor winding Lr1 and the first side winding N1, one of the magnetic flux generated by the resonant inductor Lr and the magnetic flux generated by the isolated transformer Tx is in a clockwise direction, and the other one is in an anti-clockwise direction. For example, as viewed in FIG. 2, the inductor winding Lr1 and the first side winding N1 are wound onto the magnetic portion sequentially from left to right. Current flows in at a terminal A and flows out at a terminal B of the inductor winding Lr1, then flows in at a terminal C and flows out at a terminal D of the first side winding N1. The magnetic flux generated by the inductor winding Lr1 is in an anti-clockwise direction, and the magnetic flux generated by the isolated transformer Tx is in a clockwise direction.

Still further, the integrated magnetic component 31 comprises one first magnetic core Cx1 and two second magnetic cores Cx2, which are both in a U shape. The first magnetic core Cx1 comprises two first columns Lz1 and a first back B1 connecting the two first columns Lz1. Each of the second magnetic cores Cx2 comprises two second columns Lz2 and a second back B2 connecting the two second columns Lz2. The two second columns Lz2 of one second magnetic core Cx2 are correspondingly connected to the two second columns Lz2 of the other second magnetic core Cx2, and the two first columns Lz1 of the first magnetic core Cx1 are connected to the second back B2 of one second magnetic core Cx2. In this embodiment, the inductor winding Lr1 is wound onto one of the first columns Lz1 of the first magnetic core Cx1. The first side winding N1 and the second side winding N2 are respectively wound onto the two second columns Lz2. The second back B2 of the second magnetic core Cx2 on a top is the common magnetic core portion 313. But the invention is not limited thereto. Other embodiments will be described below.

Further, the inductor winding Lr1 and the first side winding N1 are wound continuously by the same wire. It shall be noted that the inductor winding Lr1 and the first side winding N1 can be wound by any one of the triple insulated wire, Litz wire and PI wire, but the invention is not limited thereto.

Still further, an input voltage of the bidirectional isolated resonant converter is Vin, an output voltage of the bidirectional isolated resonant converter is Vo, a turn ratio of primary and secondary sides of the isolated transformer Tx is n:1, i.e., a turn ratio of the first side winding N1 to the second side winding N2 is n:1. When Vo>Vin/n, a variation of the magnetic flux of the isolated transformer Tx is delayed with respect to a variation of the magnetic flux of the resonant inductor Lr, wherein a delayed phase is between 90° and 180°. Therefore, the magnetic flux of the isolated transformer Tx and the magnetic flux of the resonant inductor Lr are at least partially offset on the common magnetic core portion 313, thereby reducing loss of the converter.

Figure 4:
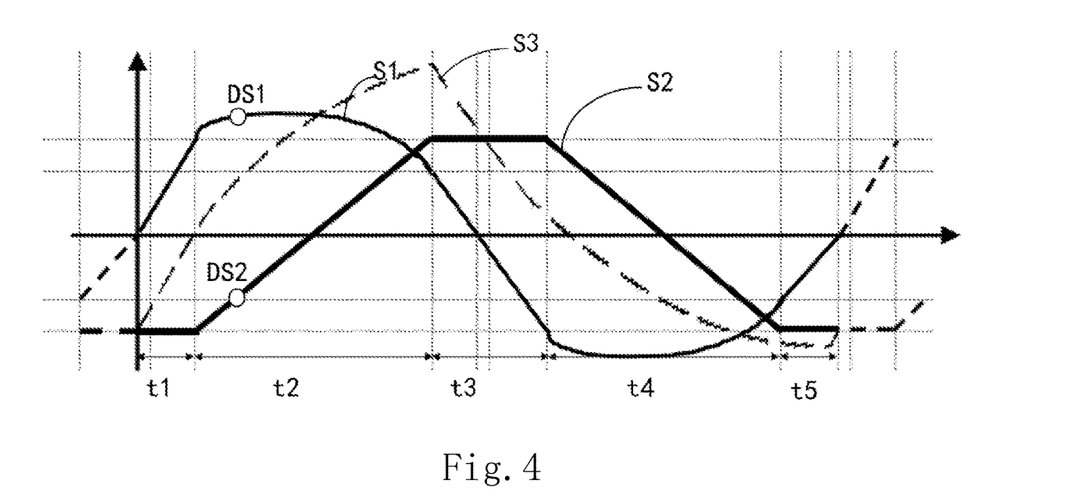
FIG. 4 is a schematic diagram of waveforms of magnetic fluxes at individual modes of the bidirectional isolated resonant converter according to the invention.

Please refer to FIG. 4, which is a schematic diagram of waveforms of magnetic fluxes at individual modes of the bidirectional isolated resonant converter according to the invention, wherein a cycle T=t1+t2+t3+t4+t5, a curve S1 represents the magnetic flux generated by the resonant inductor Lr, a curve S2 represents the magnetic flux generated by the isolated transformer Tx, and a curve S3 represents a sum of the magnetic flux generated by the isolated transformer Tx and the magnetic flux generated by the resonant inductor Lr. Please refer to FIGS. 1-3 again, the operation of the bidirectional isolated resonant converter according to the embodiment of the invention will be explained specifically.

At a first mode t1, the switches Sp1 and Sp4 are turned on, and the switches Sp2 and Sp3 are turned off; the switches Ss2 and Ss4 are turned on, the switches Ss1 and Ss3 are turned off, and a secondary side winding N2 of the isolated transformer Tx is shorted. Now it corresponds to a status in which Vin charges the resonant inductor Lr. Specifically, a current of a primary side circuit 1 flows along a path Vin→Sp1→C1→Lr→N1→Sp4→Vin, a voltage $V_{o1o2}$=Vin, a current of a secondary side circuit flows along a path N2→Ss2→Ss4→C2→N2, and a voltage $V_{o3o4}$=0, i.e., the secondary side winding N2 is shorted. The magnetic flux generated by the resonant inductor Lr increases approximately linearly from 0, and the magnetic flux generated by the isolated transformer Tx maintains the negative maximum.

At a second mode t2, the switches Ss1 and Ss4 are turned on, the switches Ss2 and Ss3 are turned off, status of the switches of the primary side circuit 1 keeps unchanged, and the voltage Vin and the resonant inductor Lr deliver energy to the secondary side circuit together. Specifically, the current of the secondary side circuit flows along a path N2→Ss1→Vo→Ss4→C2→N2, the voltage Vo=$V_{o3o4}$, i.e., the isolated transformer Tx delivers energy to the secondary side. The magnetic flux generated by the isolated transformer Tx varies linearly from the maximum in a negative direction to the maximum in a positive direction, and the magnetic flux generated by the resonant inductor Lr increases continuously, and then decreases gradually in a sinusoidal manner.

At a third mode t3, the switches Sp2 and Sp3 are turned on, the switches Sp1 and Sp4 are turned off, status of the switches of the secondary side circuit 2 keeps unchanged, and the voltage Vin and the resonant inductor Lr deliver energy to the secondary side circuit together. Specifically, the current of the primary side circuit flows along a path Vin→Sp2→C1→Lr→N1→Sp3→Vin, the voltage $V_{o1o2}$=−Vin, i.e., the isolated transformer Tx delivers energy to the secondary side. The magnetic flux generated by the isolated transformer Tx keeps unchanged, and the magnetic flux generated by the resonant inductor Lr increases gradually in the negative direction after decreasing gradually to zero in the positive direction.

At a fourth mode t4, the switches Ss2 and Ss3 are turned on, the switches Ss1 and Ss4 are turned off, status of the switches of the primary side circuit 1 keeps unchanged, and the voltage Vin and the resonant inductor Lr deliver energy to the secondary side circuit together. Specifically, the current of the secondary side circuit flows along a path N2→C2→Ss3→Vo→Ss2→N2, the voltage Vo=$V_{o3o4}$, i.e., the isolated transformer Tx delivers energy to the secondary side. The magnetic flux generated by the isolated transformer Tx varies linearly from the maximum in the positive direction to the maximum in the negative direction, and the magnetic flux generated by the resonant inductor Lr increases continuously to the maximum in the negative direction, and then decreases gradually in a sinusoidal manner.

At a fifth mode t5, the switches Sp1 and Sp4 are turned on, the switches Sp2 and Sp3 are turned off, and Vin charges the resonant inductor Lr; the switches Ss2 and Ss4 are turned on, the switches Ss1 and Ss3 are turned off, and the secondary side winding N2 of the isolated transformer Tx is shorted. Specifically, the current of the primary side circuit 1 flows along a path Vin→Sp1→C1→Lr→N1→Sp4→Vin, the voltage $V_{o1o2}$=Vin, the current of the secondary side circuit flows along a path N2→Ss2→Ss4→C2→N2, and the voltage $V_{o3o4}$=0, i.e., the secondary side winding N2 is shorted. The magnetic flux generated by the resonant inductor Lr decreases approximately linearly to 0 in the negative direction, and the magnetic flux generated by the isolated transformer Tx maintains the negative maximum.

Operation modes of the converter inside one cycle comprises five modes, and the fifth mode t5 in the figure links up with the first mode t1 of the next cycle. Taking point DS1 on the curve S1 and point DS2 on the curve S2 for example, the magnetic flux of the point DS1 is positive, the magnetic flux of the point DS2 is negative, and a sum of the magnetic fluxes on the common magnetic core portion 313 is at least partially offset. In addition, as also can be seen from FIG. 4, a variation of the magnetic flux of the isolated transformer Tx is delayed with respect to a variation of the magnetic flux of the resonant inductor Lr, a delayed time is t1+(t2+t3)/2, and a phase is $\pi/2 < \pi(t1+(t2+t3)/2)/(t1+t2+t3) < \pi$ after conversion, i.e., the delayed phase is between 90° to 180°, such that the magnetic flux generated by the isolated transformer Tx and the magnetic flux generated by the resonant inductor Lr are at least partially offset on the common magnetic core portion 313 as a whole, and a sum S3 is small, thereby reducing loss of the converter.

It shall be noted that in this embodiment, the first side winding N1 of the isolated transformer Tx serves as the primary side winding, and the second side winding N2 serves as the secondary side winding. Correspondingly, the first side circuit 1 serves as the primary side circuit, second side circuit 2 serves as the secondary side circuit, and energy is delivered from the first side circuit 1 to the second side circuit 2 via the resonant tank circuit 3. However, this is only one operation status of the bidirectional isolated resonant converter in the disclosure. In another operation status, the second side winding N2 of the isolated transformer Tx can serve as the primary side winding, and the first side winding N1 serves as the secondary side winding. Correspondingly, the second side circuit 2 serves as the primary side circuit, the first side circuit 1 serves as the secondary side circuit, and energy is delivered from the second side circuit 2 to the first side circuit 1 via the resonant tank circuit 3. For example, in one operation status, the converter charges the on board high voltage battery with inputted power supply; while in another operation status, the converter supplies the DC current obtained from the on board high voltage battery to applications of some on board devices or feedback to the grid after conversion into AC current.

Figure 5:
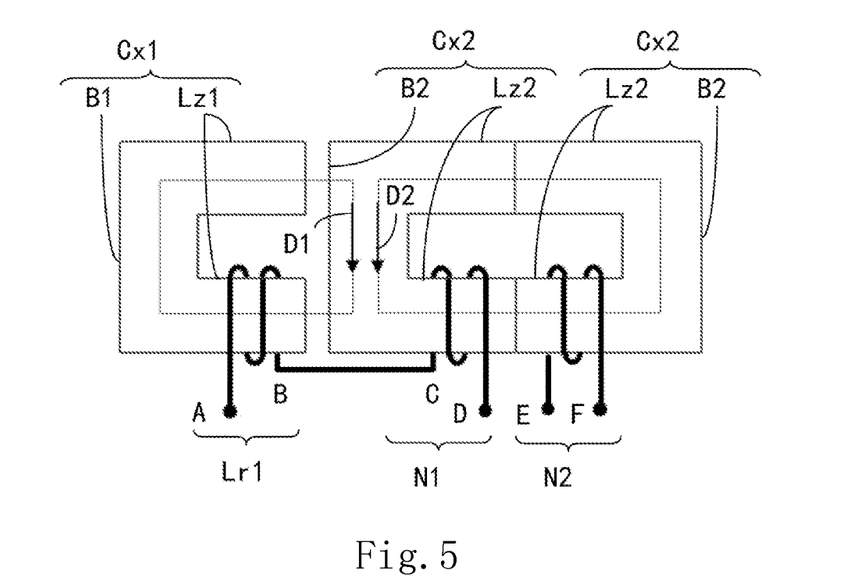
FIG. 5 is a connection diagram of a second embodiment of an integrated magnetic component according to the invention.

Please refer to FIG. 5, which is a connection diagram of a second embodiment of an integrated magnetic component according to the invention. The integrated magnetic component shown in FIG. 5 and the integrated magnetic component shown in FIG. 3 have substantially the same structure, so the descriptions for the same parts are omitted here. Different parts are explained below. In this embodiment, the difference is that the inductor winding Lr1 is wound onto one of the first columns Lz1 of the first magnetic core Cx1, the first side winding N1 and the second side winding N2 are wound onto the two second columns Lz2, and positions of the inductor winding Lr1, the first side winding N1 and the second side winding N2 are on the same horizontal line.

Figure 6:
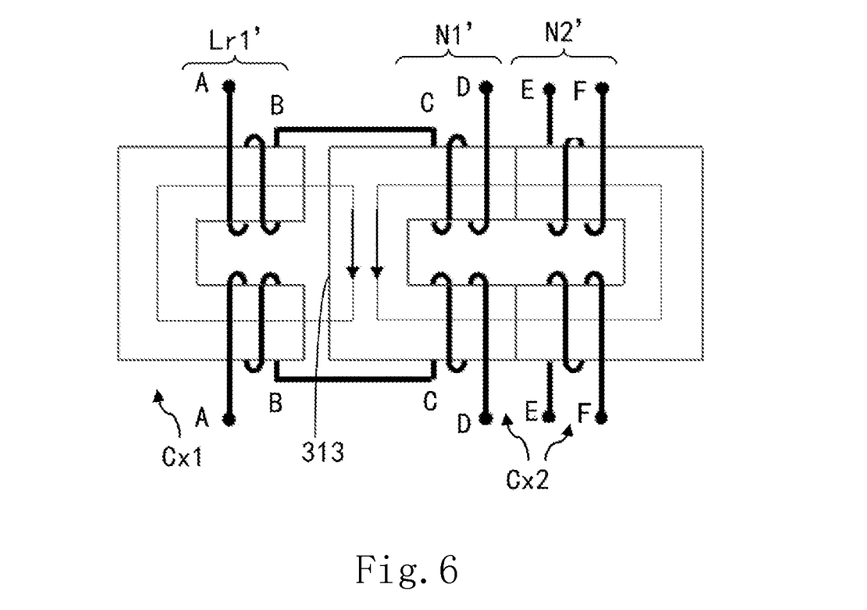
FIG. 6 is a connection diagram of a third embodiment of an integrated magnetic component according to the invention.

Please refer to FIG. 6, which is a connection diagram of a third embodiment of an integrated magnetic component according to the invention. The integrated magnetic component shown in FIG. 6 and the integrated magnetic component shown in FIG. 5 have substantially the same structure, so the descriptions for the same parts are omitted here. Different parts are explained below. In this embodiment, the difference is that the integrated magnetic component further comprises another inductor winding Lr1', another first side winding N1' and another second side winding N2'; wherein the inductor winding Lr1', the first side winding N1' and the second side winding N2' are correspondingly wound onto the first columns Lz1 and the second columns Lz2 on the other side, respectively. Connection structures and wrapping manners of the inductor winding Lr1', the first side winding N1' and the second side winding N2' are the same as that of the inductor winding Lr1, the first side winding N1 and the second side winding N2 in FIG. 5.

Figure 7:
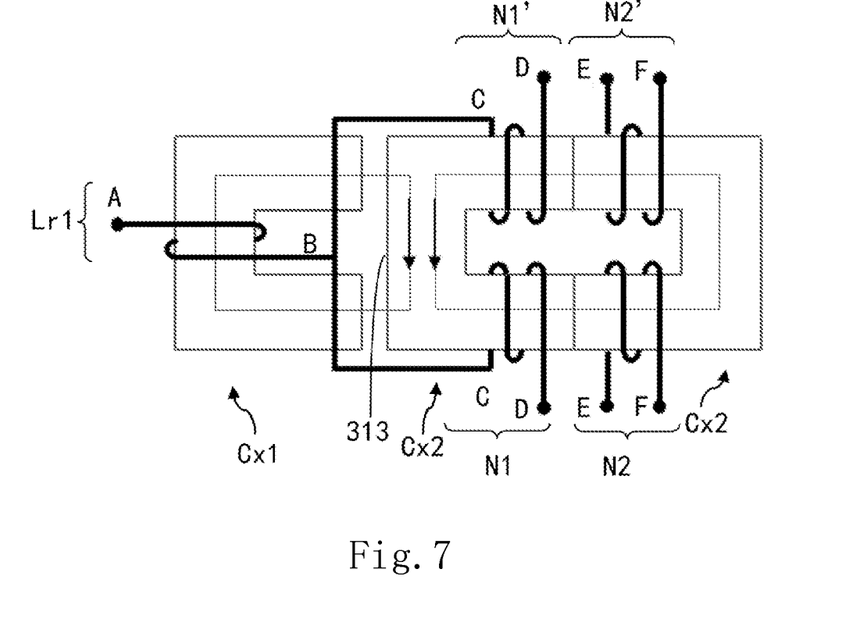
FIG. 7 is a connection diagram of a fourth embodiment of an integrated magnetic component according to the invention.

Please refer to FIG. 7, which is a connection diagram of a fourth embodiment of an integrated magnetic component according to the invention. The integrated magnetic component shown in FIG. 7 and the integrated magnetic component shown in FIG. 6 have substantially the same structure, so the descriptions for the same parts are omitted here. Different parts are explained below. In this embodiment, the difference is that the integrated magnetic component comprises one inductor winding Lr1, two first side windings N1, N1' and two second side windings N2, N2'. The inductor winding Lr1 is wound onto the back B1 of the first magnetic core Cx1, and the second terminal B of the inductor winding Lr1 is electrically connected to the first terminal C of the two first side windings N1, N1'.

Figure 8:
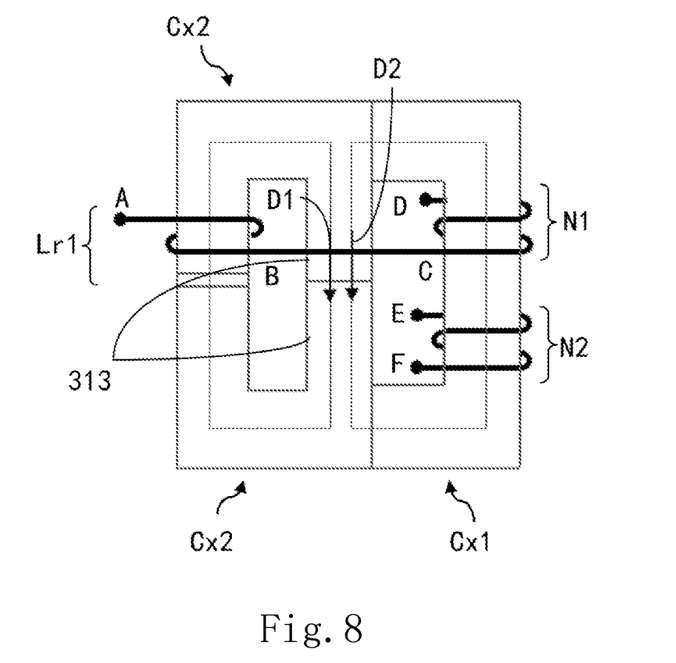
FIG. 8 is a connection diagram of a fifth embodiment of an integrated magnetic component according to the invention.

Please refer to FIG. 8, which is a connection diagram of a fifth embodiment of an integrated magnetic component according to the invention. As shown in FIG. 8, in this embodiment, the integrated magnetic component 31 comprises one first magnetic core Cx1 and two second magnetic cores Cx2, and structures of the first magnetic core Cx1 and the second magnetic cores Cx2 are the same as those in the above embodiments. The difference is that the two first columns Lz1 of the first magnetic core Cx1 are connected to the two correspondingly connected second columns Lz2. The inductor winding Lr1 is wound onto the second columns Lz2 outside the second magnetic cores Cx2, the first side winding N1 and the second side winding N2 are wound onto the back of the first magnetic core Cx1, and the two second columns Lz2 inside the two second magnetic cores Cx2 are the common magnetic core portion 313.

Figure 9:
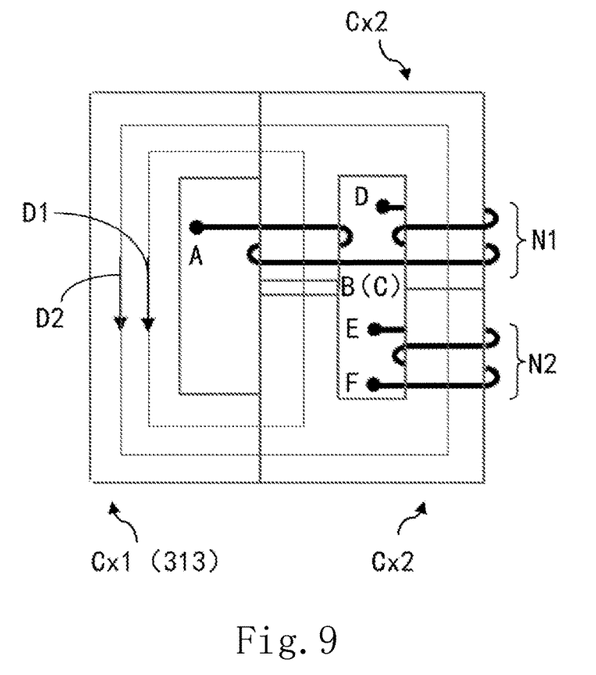
FIG. 9 is a connection diagram of a sixth embodiment of an integrated magnetic component according to the invention.

Please refer to FIG. 9, which is a connection diagram of a sixth embodiment of an integrated magnetic component according to the invention. As shown in FIG. 9, in this embodiment, the common magnetic core portion 313 is located on one side of the inductor magnetic core portion 311 and the transformer magnetic core portion 312. When the same current is flowing in the inductor winding Lr1 and the first side winding N1, both the magnetic flux generated by the resonant inductor Lr and the magnetic flux generated by the isolated transformer Tx are in a clockwise or anti-clockwise direction. The integrated magnetic component 31 comprises one first magnetic core Cx1 and two second magnetic cores Cx2, and structures of the first magnetic core Cx1 and the second magnetic cores Cx2 are the same as those in the above embodiments. The difference is that the two first columns Lz1 of the first magnetic core Cx1 are connected to the two correspondingly connected second columns Lz2. The inductor winding Lr1 is wound onto the columns Lz2 inside the second magnetic cores Cx2, the first side winding N1 is wound onto the columns Lz2 outside the second magnetic cores Cx2, the second side winding N2 is wound onto the columns Lz2 outside the second magnetic cores Cx2, and the first magnetic core Cx1 is the common magnetic core portion 311.

Figure 10:
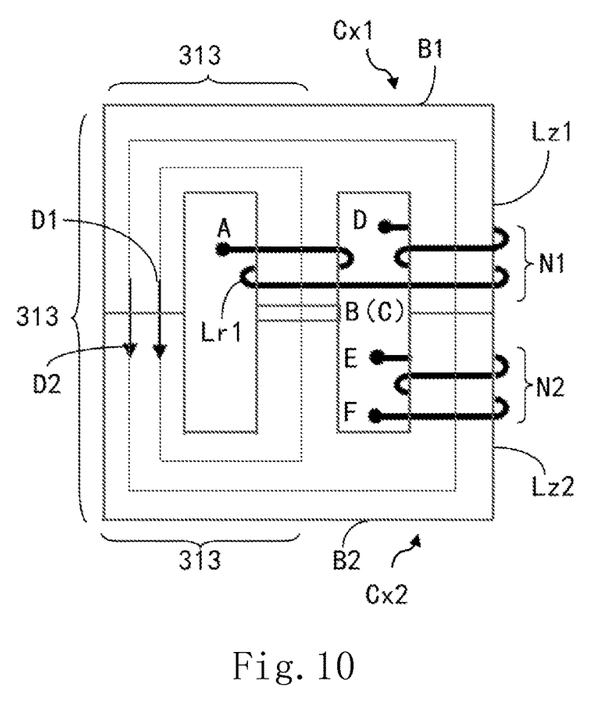
FIG. 10 is a connection diagram of a seventh embodiment of an integrated magnetic component according to the invention.

Please refer to FIG. 10, which is a connection diagram of a seventh embodiment of an integrated magnetic component according to the invention. As shown in FIG. 10, in this embodiment, the integrated magnetic component comprises a first magnetic core Cx1 and a second magnetic core Cx2, which are in an E shape. The first magnetic core Cx1 comprises three first columns Lz1 and a first back B1 connecting the three first columns Lz1, the second magnetic core Cx2 comprises three second columns Lz2 and a second back B2 connecting the three second columns Lz2, and the three first columns Lz1 are connected to the three second columns Lz2 correspondingly. The inductor winding Lr1 is wound onto the Lz1 and/or the corresponding Lz2, the windings N1 and N2 of the transformer are wound onto the Lz1 and/or the corresponding Lz2, and the unwound first columns Lz1, the second columns Lz2 connected to the first columns Lz1, the portion of the first back B1 and the portion of the second back B2 are the common magnetic core portion 313.

Figure 11:
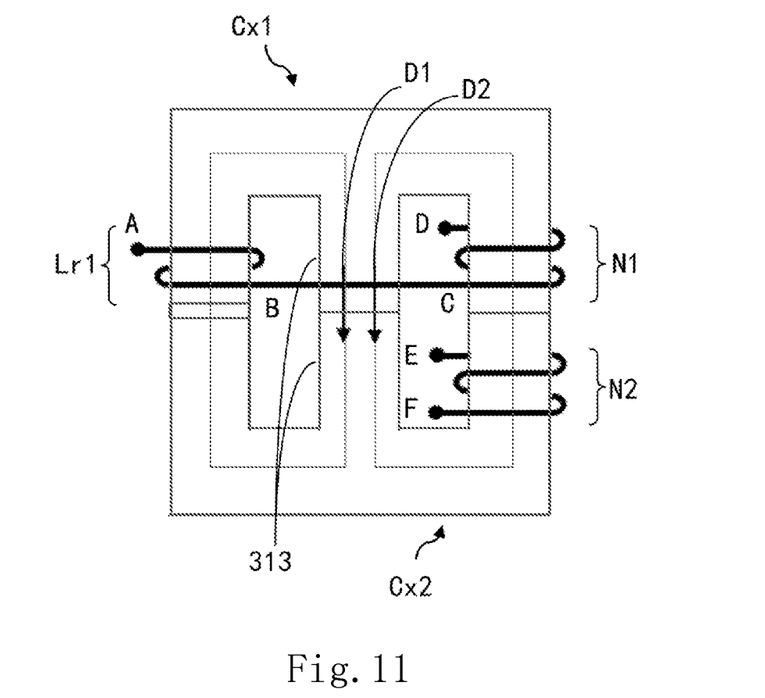
FIG. 11 is a connection diagram of an eighth embodiment of an integrated magnetic component according to the invention.

Please refer to FIG. 11, which is a connection diagram of an eighth embodiment of an integrated magnetic component according to the invention. The integrated magnetic component shown in FIG. 11 and the integrated magnetic component shown in FIG. 10 have substantially the same structure, so the descriptions for the same parts are omitted here. Different parts are explained below. In this embodiment, the difference is that the inductor winding Lr1 is wound onto the Lz1 and/or the corresponding Lz2, the windings N1 and N2 of the transformer are wound onto the Lz1 and/or the corresponding Lz2, and the first column Lz1 in the middle and the corresponding second column Lz2 are the common magnetic core portion 313.

It shall be noticed that although the invention takes U-shaped magnetic cores and E-shaped magnetic cores for example, the shape of the magnetic cores and the shape of the columns are not limited thereto. The magnetic cores may also be in PQ shape, and the shape of the columns may also be in circular, square, oval shape, or the like.

In conclusion, the bidirectional isolated resonant converter provided in the embodiments of the invention integrates the resonant inductor and the isolated transformer into an integrated magnetic component, thereby reducing volume of the converter. Meanwhile, by arranging the magnetic core structures and wrapping manners of the resonant inductor and the isolated transformer, the magnetic flux generated by the resonant inductor and the magnetic flux generated by the isolated transformer are in the same direction on the common magnetic core portion when the same current is flowing in the inductor winding and the first side winding of the isolated transformer. Further, when the converter works normally at Vo>Vin/n, the magnetic flux generated by the resonant inductor and the magnetic flux generated by the isolated transformer can be at least partially offset, thereby reducing loss of the converter.

Although the invention has been disclosed by the above embodiments, the invention is not limited thereto. Without departing from spirit and scope of the invention, those skilled in the art can make various variations and modifications, so the protection scope of the invention shall be determined by the protection scope defined by the appended claims.

What is claimed is:

1. A bidirectional isolated resonant converter with integrated resonant inductor and isolated transformer, comprising a first side circuit, a second side circuit, and a resonant tank circuit electrically coupled between the first side circuit and the second side circuit, the resonant tank circuit comprising a first resonant capacitor, a resonant inductor, an isolated transformer and a second capacitor, wherein the first resonant capacitor, the resonant inductor and a first side winding of the isolated transformer are connected in series, and a second side winding of the isolated transformer and the second capacitor are connected in series; wherein the resonant inductor and the isolated transformer are integrated into an integrated magnetic component, a magnetic core of the integrated magnetic component comprising an inductor magnetic core portion on which an inductor winding of the resonant inductor is wound, a transformer magnetic core portion on which the first side winding and the second side winding of the isolated transformer are wound, and a common magnetic core portion shared by the resonant inductor and the isolated transformer to form closed magnetic path, respectively; wherein when the same current is flowing in the inductor winding and the first side winding, a magnetic flux generated by the resonant inductor and a magnetic flux generated by the isolated transformer have the same direction on the common magnetic core portion; wherein an input voltage of the bidirectional isolated resonant converter is Vin, an output voltage of the bidirectional isolated resonant converter is Vo, a turn ratio of primary and secondary sides of the isolated transformer is n, and when Vo>Vin/n, a variation of the magnetic flux of the isolated transformer is delayed with respect to a variation of the magnetic flux of the resonant inductor, where a delayed phase is between 90 and 180.

2. The bidirectional isolated resonant converter according to claim 1, wherein the first side circuit is a full-bridge circuit comprising a first bridge arm and a second bridge arm, wherein one terminal of the first side winding is electrically connected to a midpoint of the first bridge arm via the resonant inductor and the first resonant capacitor sequentially, and the other terminal of the first side winding is electrically connected to a midpoint of the second bridge arm.

3. The bidirectional isolated resonant converter according to claim 2, wherein the second side circuit is a full-bridge circuit comprising a third bridge arm and a fourth bridge arm, wherein one terminal of the second side winding is electrically connected to a midpoint of the third bridge arm, and the other terminal of the second side winding is electrically connected to a midpoint of the fourth bridge arm via the second capacitor.

4. The bidirectional isolated resonant converter according to claim 3, wherein the first bridge arm, the second bridge arm, the third bridge arm and the fourth bridge arm each comprises two switches groups connected in series between which the midpoints are located.

5. The bidirectional isolated resonant converter according to claim 1, wherein the magnetic flux generated by the isolated transformer and the magnetic flux generated by the resonant inductor are at least partially offset on the common magnetic core portion.

6. The bidirectional isolated resonant converter according to claim 1, wherein the inductor magnetic core portion is provided with at least one air gap.

7. The bidirectional isolated resonant converter according to claim 1, wherein the inductor winding and the first side winding are wound continuously by the same wire.

8. The bidirectional isolated resonant converter according to claim 1, wherein the inductor winding and the first side winding are wound by any one of triple insulated wire, Litz wire and PI wire.

9. The bidirectional isolated resonant converter according to claim 1, wherein the common magnetic core portion is located between the inductor magnetic core portion and the transformer magnetic core portion, and when the same current is flowing in the inductor winding and the first side winding, one of the magnetic flux generated by the resonant inductor and the magnetic flux generated by the isolated transformer is in a clockwise direction, and the other one is in an anti-clockwise direction.

10. The bidirectional isolated resonant converter according to claim 1, wherein the common magnetic core portion is located on one side of the inductor magnetic core portion and the transformer magnetic core portion, and when the same current is flowing in the inductor winding and the first side winding, the magnetic flux generated by the resonant inductor and the magnetic flux generated by the isolated transformer are both in a clockwise or an anti-clockwise direction.

11. The bidirectional isolated resonant converter according to claim 1, wherein the integrated magnetic component comprises one first magnetic core comprising two first columns and a first back connecting the two first columns, and two second magnetic cores, each comprising two second columns and a second back connecting the two second columns, wherein the two second columns of one of the second magnetic core are connected to the two second columns of the other second magnetic core correspondingly, and wherein the two first columns of the first magnetic core are connected to the second back of one second magnetic core.

12. The bidirectional isolated resonant converter according to claim 1, wherein the integrated magnetic component comprises one first magnetic core comprising two first columns and a first back connecting the two first columns, and two second magnetic cores, each comprising two second columns and a second back connecting the two second columns, wherein the two second columns of one of the second magnetic core are connected to the two second columns of the other second magnetic core correspondingly, and wherein the two first columns of the first magnetic core are connected to the two correspondingly connected second columns.

13. The bidirectional isolated resonant converter according to claim 1, wherein the integrated magnetic component comprises a first magnetic core comprising three first columns and a first back connecting the three first columns, and a second magnetic core comprising three second columns and a second back connecting the three second columns, and wherein the three first columns are connected to the three second columns correspondingly.

* * * * *